United States Patent
Tomizawa et al.

(10) Patent No.: US 11,916,188 B2
(45) Date of Patent: Feb. 27, 2024

(54) ALL SOLID BATTERY AND MANUFACTURING METHOD OF THE SAME

(71) Applicant: TAIYO YUDEN CO., LTD., Tokyo (JP)

(72) Inventors: Sachie Tomizawa, Tokyo (JP); Daigo Ito, Tokyo (JP); Chie Kawamura, Tokyo (JP); Masashi Sekiguchi, Tokyo (JP); Takato Satoh, Tokyo (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 344 days.

(21) Appl. No.: 16/822,394

(22) Filed: Mar. 18, 2020

(65) Prior Publication Data
US 2020/0313233 A1    Oct. 1, 2020

(30) Foreign Application Priority Data
Mar. 28, 2019 (JP) ................. 2019-064647

(51) Int. Cl.
   *H01M 10/0562* (2010.01)
   *H01M 4/133* (2010.01)
   *H01M 4/02* (2006.01)

(52) U.S. Cl.
   CPC ....... *H01M 10/0562* (2013.01); *H01M 4/133* (2013.01); *H01M 2004/021* (2013.01); *H01M 2300/0008* (2013.01)

(58) Field of Classification Search
None
See application file for complete search history.

(56) References Cited

U.S. PATENT DOCUMENTS

| | | | |
|---|---|---|---|
| 9,543,568 B2* | 1/2017 | Sung | H01M 10/0525 |
| 2009/0311599 A1* | 12/2009 | Kawai | H01M 4/133 |
| | | | 29/623.5 |
| 2013/0224584 A1 | 8/2013 | Sung et al. | 429/211 |
| 2013/0252093 A1 | 9/2013 | Yokomizo et al. | 429/211 |
| 2015/0243989 A1 | 8/2015 | Yamada et al. | H01M 4/587 |
| 2016/0181657 A1* | 6/2016 | Kawaji | H01M 10/0525 |
| | | | 429/162 |

FOREIGN PATENT DOCUMENTS

| | | |
|---|---|---|
| CN | 103190019 A | 7/2013 |
| CN | 103201882 A | 7/2013 |

(Continued)

OTHER PUBLICATIONS

Notice of Reasons for Refusal dated Jan. 5, 2023 in counterpart Japanese Patent Application No. 2019-064647.

(Continued)

*Primary Examiner* — Helen Oi K Conley
(74) *Attorney, Agent, or Firm* — Stein IP, LLC

(57) ABSTRACT

An all solid battery includes: a solid electrolyte layer including a glass component, a main component of the solid electrolyte layer being phosphoric acid salt-based solid electrolyte; and electrode layers that are provided on both main faces of the solid electrolyte layer, wherein the electrode layers include a carbon material having an average particle diameter of 40 nm or more and 120 nm or less, wherein a DBP oil absorption of the carbon material is 200 mL/100 g or less.

5 Claims, 4 Drawing Sheets

(56) References Cited

FOREIGN PATENT DOCUMENTS

| | | | |
|---|---|---|---|
| CN | 104584286 A | 4/2015 | |
| JP | 2005-085729 A | 3/2005 | |
| JP | WO 2014/030720 * | 2/2014 | ............ H01M 4/36 |
| JP | 2017-212123 A | 11/2017 | |
| JP | 2018-170189 A | 11/2018 | |

OTHER PUBLICATIONS

Hideyuki Hisashi, "Current State of Electroconductive Carbonblack", Journal of Printing Science and Technology, vol. 44, Issue 3, pp. 133-143, 2007.
Notification of Reasons for Refusal dated Oct. 17, 2023 in a counterpart Japanese Patent Application No. 2019-064647.
Notification of First Office Action dated Oct. 31, 2023, issued by the China National Intellectual Property Administration in corresponding application CN 202010217664.9.

* cited by examiner

ALL SOLID BATTERY AND MANUFACTURING METHOD OF THE SAME

CROSS-REFERENCE TO RELATED APPLICATION

This application is based upon and claims the benefit of priority of the prior Japanese Patent Application No. 2019-064647, filed on Mar. 28, 2019, the entire contents of which are incorporated herein by reference.

FIELD

A certain aspect of the present invention relates to an all solid battery and a manufacturing method of the all solid battery.

BACKGROUND

Recently, secondary batteries are being used in various fields. Secondary batteries having electrolytic liquid have a problem such as leak of the electrolytic liquid. And so, all solid batteries having a solid electrolyte and other solid elements are being developed.

SUMMARY OF THE INVENTION

It is thought that Pd (palladium) is used as conductive auxiliary agent of electrode layers, with use of characteristic in which Pd hardly reacts each material. However, Pd in the electrode layers suppresses increasing of an amount of an added active material in the electrode layers. And so, it is preferable that carbon is used as the conductive auxiliary agent of the electrode layers (for example, see Japanese Patent Application Publication No. 2017-212123). However, when the carbon is used as the conductive auxiliary agent of the electrode layers, ionic conductivity may be degraded.

The present invention has a purpose of providing an all solid battery and a manufacturing method of the all solid battery that are capable of securing electron conductivity and ionic conductivity.

According to an aspect of the present invention, there is provided an all solid battery including: a solid electrolyte layer including a glass component, a main component of the solid electrolyte layer being phosphoric acid salt-based solid electrolyte; and electrode layers that are provided on both main faces of the solid electrolyte layer, wherein the electrode layers include a carbon material having an average particle diameter of 40 nm or more and 120 nm or less, wherein a DBP oil absorption of the carbon material is 200 mL/100 g or less.

According to an aspect of the present invention, there is provided a manufacturing method of an all solid battery including: preparing a multilayer structure in which first electrode paste including a first carbon material, a green sheet including phosphoric acid salt-based solid electrolyte grains, and second electrode paste including a second carbon material are stacked in this order; and firing the multilayer structure, wherein the first carbon material and the second carbon material have an average particle diameter of 40 nm or more and 120 nm or less, wherein a DBP oil absorption is 200 mL/100 g or less.

DETAILED DESCRIPTION

A description will be given of an embodiment with reference to the accompanying drawings.

Figure 1:
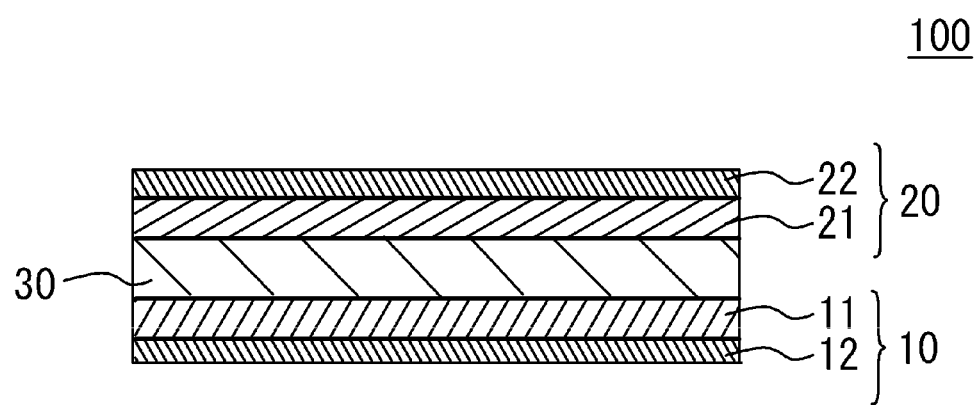
FIG. 1 illustrates a schematic cross section of an all solid battery.

FIG. 1 illustrates a schematic cross section of an all solid battery 100 in accordance with an embodiment. As illustrated in FIG. 1, the all solid battery 100 has a structure in which a first electrode 10 and a second electrode 20 sandwich a phosphoric acid salt-based solid electrolyte layer 30. The first electrode 10 is provided on a first main face of the solid electrolyte layer 30. The first electrode 10 has a structure in which a first electrode layer 11 and a first electric collector layer 12 are stacked. The first electrode layer 11 is on the solid electrolyte layer 30 side. The second electrode 20 is provided on a second main face of the solid electrolyte layer 30. The second electrode 20 has a structure in which a second electrode layer 21 and a second electric collector layer 22 are stacked. The second electrode layer 21 is on the solid electrolyte layer 30 side.

When the all solid battery 100 is used as a secondary battery, one of the first electrode 10 and the second electrode 20 is used as a positive electrode and the other is used as a negative electrode. In the embodiment, as an example, the first electrode 10 is used as a positive electrode, and the second electrode 20 is used as a negative electrode.

At least, the solid electrolyte layer 30 is a phosphoric acid salt-based solid electrolyte. For example, the phosphoric acid salt-based electrolyte has a NASICON structure. The phosphoric acid salt-based solid electrolyte having the NASICON structure has a high conductivity and is stable in normal atmosphere. The phosphoric acid salt-based solid electrolyte is, for example, such as a salt of phosphoric acid including lithium. The phosphoric acid salt is not limited. For example, the phosphoric acid salt is such as composite salt of phosphoric acid with Ti (for example $LiTi_2(PO_4)_3$). Alternatively, at least a part of Ti may be replaced with a transition metal of which a valence is four, such as Ge, Sn, Hf, or Zr. In order to increase an amount of Li, a part of Ti may be replaced with a transition metal of which a valence is three, such as Al, Ga, In, Y or La. In concrete, the phosphoric acid salt including lithium and having the NASICON structure is $Li_{1+x}Al_xGe_{2-x}(PO_4)_3$, $Li_{1+x}Al_xZr_{2-x}(PO_4)_3$, $Li_{1+x}Al_xT_{2-x}(PO_4)_3$ or the like. For example, it is preferable that Li—Al—Ge—$PO_4$-based material, to which a transition metal included in the phosphoric acid salt having the olivine type crystal structure included in the first electrode layer 11 and the second electrode layer 21 is added in advance, is used. For example, when the first electrode layer 11 and the second electrode layer 21 include phosphoric acid salt including Co and Li, it is preferable that the solid electrolyte layer 30 includes Li—Al—Ge—$PO_4$-based material to which Co is added in advance. In this case, it is possible to suppress solving of the transition metal included in the electrode active material into the electrolyte.

It is possible to form the solid electrolyte layer 30 by sintering material powder. For example, it is possible to form the solid electrolyte layer 30 by liquid-phase sintering. When the solid electrolyte layer 30 is made of only Li—Al—Ge—$PO_4$-based material, only Li—Al—Ti—$PO_4$-based material, or only Li—Al—Zr—$PO_4$-based material, the solid electrolyte layer 30 is liquid-phase sintered. However, the solid electrolyte layer 30 may include a glass component, a sintering assistant or the like. For example, the sintering assistant may include one or more of glass components such as Li—B—O-based compound, Li—Si—O-based compound, Li—C—O-based compound, Li—S—O-based compound, or Li—P—O-based compound.

At least, the first electrode layer 11 used as a positive electrode includes a material having an olivine type crystal structure, as an electrode active material. It is preferable that the second electrode layer 21 also includes the electrode active material. The electrode active material is such as phosphoric acid salt including a transition metal and lithium. The olivine type crystal structure is a crystal of natural olivine. It is possible to identify the olivine type crystal structure, by using X-ray diffraction.

For example, $LiCoPO_4$ including Co may be used as a typical example of the electrode active material having the olivine type crystal structure. Other salts of phosphoric acid, in which Co acting as a transition metal is replaced to another transition metal in the above-mentioned chemical formula, may be used. A ratio of Li or $PO_4$ may fluctuate in accordance with a valence. It is preferable that Co, Mn, Fe, Ni or the like is used as the transition metal.

The electrode active material having the olivine type crystal structure acts as a positive electrode active material in the first electrode layer 11 acting as a positive electrode. For example, when only the first electrode layer 11 includes the electrode active material having the olivine type crystal structure, the electrode active material acts as the positive electrode active material. When the second electrode layer 21 also includes an electrode active material having the olivine type crystal structure, discharge capacity may increase and an operation voltage may increase because of electric discharge, in the second electrode layer 21 acting as a negative electrode. The function mechanism is not completely clear. However, the mechanism may be caused by partial solid-phase formation together with the negative electrode active material.

When both the first electrode layer 11 and the second electrode layer 21 include an electrode active material having the olivine type crystal structure, the electrode active material of each of the first electrode layer 11 and the second electrode layer 21 may have a common transition metal. Alternatively, the a transition metal of the electrode active material of the first electrode layer 11 may be different from that of the second electrode layer 21. The first electrode layer 11 and the second electrode layer 21 may have only single type of transition metal. The first electrode layer 11 and the second electrode layer 21 may have two or more types of transition metal. It is preferable that the first electrode layer 11 and the second electrode layer 21 have a common transition metal. It is more preferable that the electrode active materials of the both electrode layers have the same chemical composition. When the first electrode layer 11 and the second electrode layer 21 have a common transition metal or a common electrode active material of the same composition, similarity between the compositions of the both electrode layers increases. Therefore, even if terminals of the all solid battery 100 are connected in a positive/negative reversed state, the all solid battery 100 can be actually used without malfunction, in accordance with the usage purpose.

The second electrode layer 21 may include known material as the negative electrode active material. When only one of the electrode layers includes the negative electrode active material, it is clarified that the one of the electrode layers acts as a negative electrode and the other acts as a positive electrode. When only one of the electrode layers includes the negative electrode active material, it is preferable that the one of the electrode layers is the second electrode layer 21. Both of the electrode layers may include the known material as the negative electrode active material. Conventional technology of secondary batteries may be applied to the negative electrode active material. For example, titanium oxide, lithium-titanium complex oxide, lithium-titanium complex salt of phosphoric acid salt, a carbon, a vanadium lithium phosphate.

In the forming process of the first electrode layer 11 and the second electrode layer 21, moreover, oxide-based solid electrolyte material or a conductive material (conductive auxiliary agent) such as a carbon or a metal may be added. When the material is evenly dispersed into water or organic solution together with binder or plasticizer, paste for electrode layer is obtained. In the embodiment, a carbon material is included as the conductive auxiliary agent. Moreover, a metal may be included as another conductive auxiliary agent. Pd, Ni, Cu, or Fe, or an alloy thereof may be used as the metal of the conductive auxiliary agent.

The first electric collector layer 12 and the second electric collector layer 22 are made of a conductive material.

Figure 2:
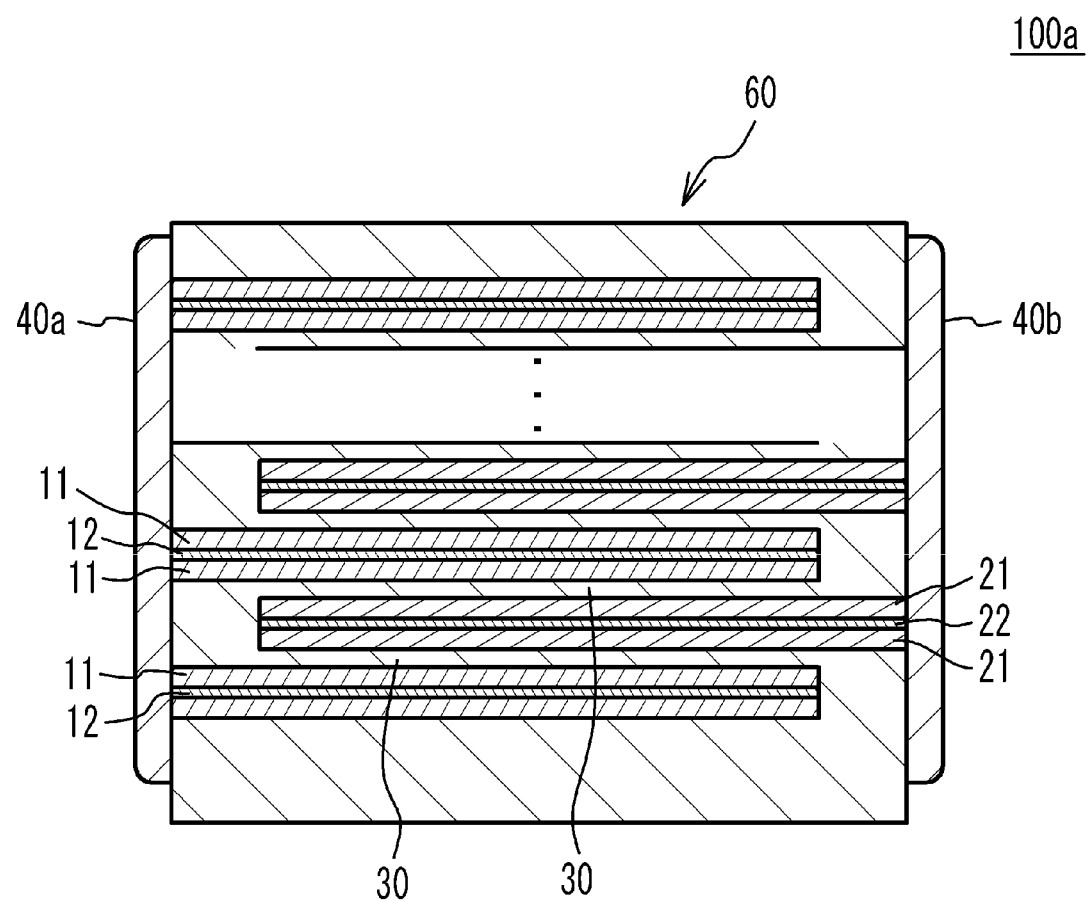
FIG. 2 illustrates a schematic cross section of another all solid battery.

FIG. 2 illustrates a schematic cross section of an all solid battery 100a in accordance with another embodiment. The all solid battery 100a has a multilayer chip 60 having a rectangular parallelepiped shape, a first external electrode 40a provided on a first edge face of the multilayer chip 60, and a second external electrode 40b provided on a second edge face facing with the first edge face. In the following description, the same numeral is added to each member that is the same as that of the all solid battery 100. And, a detail explanation of the same member is omitted.

In the all solid battery 100a, each of the first electric collector layers 12 and each of the second electric collector layers 22 are alternately stacked. Edges of the first electric collector layers 12 are exposed to the first edge face of the multilayer chip 60 but are not exposed to the second edge face of the multilayer chip 60. Edges of the second electric collector layers 22 are exposed to the second edge face of the multilayer chip 60 but are not exposed to the first edge face. Thus, each of the first electric collector layers 12 and each of the second electric collector layers 22 are alternately conducted to the first external electrode and the second external electrode 40b.

The first electrode layer 11 is stacked on the first electric collector layer 12. The solid electrolyte layer 30 is stacked on the first electrode layer 11. The solid electrolyte layer extends from the first external electrode 40a to the second external electrode 40b. The second electrode layer 21 is stacked on the solid electrolyte layer 30. The second electric collector layer 22 is stacked on the second electrode layer 21. Another second electrode layer 21 is stacked on the second electric collector layer 22. Another solid electrolyte layer 30 is stacked on the second electrode layer 21. The solid electrolyte layer 30 extends from the first external electrode 40a to the second external electrode 40b. The first electrode layer 11 is stacked on the solid electrolyte layer 30. In the all solid battery 100a, the stack units are repeatedly stacked. Therefore, the all solid battery 100a has a structure in which a plurality of cell units are stacked.

It is preferable that a material which is hardly oxidized and hardly reacts with each material is used as a metal applied to the electric collector layer, in an all solid battery having phosphoric acid salt-based solid electrolyte and is manufactured by firing, as in the case of the all solid battery 100 or the all solid battery 100a. And so, the first electric collector layer 12 and the second electric collector layer 22 include Pd or carbon as a conductive material.

It is thought that Pd is used as a conductive auxiliary agent of the first electrode layer 11 and the second electrode layer 21, with use of characteristic in which Pd hardly reacts each material. However, it is preferable that a ratio of Pd in the first electrode layer 11 and the second electrode layer 21 is 20 vol. % to 50 vol. %, from a viewpoint of achieving conductive network in the electrode layers by spheroidizing of Pd and grain growing of Pd in the firing process. And, Pd prevents increasing of the amount of added active material in the electrode layers, when the volume fractional ratio of Pd is increased. Clarke number of Pd is extremely small. Therefore, Pd is very expensive. And so, it is preferable that a carbon material is used as the conductive auxiliary agent of the first electrode layer 11 and the second electrode layer 21. On the other hand, carbon is not spheroidized during a firing. And, grains of carbon does not grow during the firing. Therefore, carbon hardly prevents increasing of the amount of the added active material in the electrode layers, because carbons achieves high conductivity with a less volume fractional ratio. Moreover, carbon is not expensive. However, the carbon material tends to adsorb the liquid phase of the glass component during liquid-phase sintering of the solid electrolyte layer 30. When the carbon material adsorbs the liquid phase of the glass component, the density degree of the solid electrolyte layer 30 is reduced because of prevention of sintering of the solid electrolyte layer 30 or composition gap of the solid electrolyte layer 30. And, ionic conductivity of the solid electrolyte layer 30 may be degraded.

And so, in the embodiment, a carbon material of which a DBP oil absorption is small is used. In concrete, a carbon material of which the DBP absorption is 200 mL/100 g or less is used. For example, when a carbon material of which a porosity is small is used, the DBP oil absorption is reduced. From a viewpoint of reducing an absorption amount of liquid phase of a glass component, it is preferable that the DBP oil absorption is small. And so, it is preferable that the DBP oil absorption of the carbon material is 200 mL/100 g or less. It is more preferable that the DBP oil absorption is 100 mL/100 g or less. It is possible to measure the DBP absorption in accordance with JIS K 6217-4.

When an average particle diameter of the carbon material is excessively small, the carbon material may be oxidized and disappear during a firing process and electron conductivity may be degraded. And so, it is preferable that the average particle diameter of the carbon material has a lower limit. In the embodiment, the average particle diameter of the carbon material is 40 nm or more. From a viewpoint of suppressing disappearance of the carbon material, it is preferable that the average particle diameter of the carbon material is large. And so, it is preferable that the average particle diameter of the carbon material is 40 nm or more. It is more preferable that the average particle diameter of the carbon material is 50 nm or more.

When the average particle diameter of the carbon material is excessively large, formation of network of the conductive auxiliary agent is suppressed during the firing process and the electron conductivity may be degraded. And so, it is preferable that the average particle diameter of the carbon material has an upper limit. In the embodiment, the average particle diameter of the carbon material is 120 nm or less. From a viewpoint of forming the network of the conductive auxiliary agent during the firing process, it is preferable that the average particle diameter of the carbon material is small. And so, it is preferable that the average particle diameter of the carbon material is 200 nm or less. It is more preferable that the average particle diameter of the carbon material is 100 nm or less.

In the embodiment, the first electrode layer 11 and the second electrode layer 21 include the carbon material of which the DBP oil absorption is 200 mL/100 g or less, as the conductive auxiliary agent. With the structure, the amount of the glass component of the solid electrolyte layer 30 adsorbed to the carbon material is suppressed during the firing process. In this case, the sintering of the solid electrolyte layer 30 is promoted. And, prevention of the sintering of the solid electrolyte layer 30 or composition gap is suppressed. Therefore, the densifying of the solid electrolyte layer 30 is promoted. Accordingly, the ionic conductivity of the solid electrolyte layer 30 is improved.

When the average particle diameter of the carbon material is 40 nm or more, the disappearance of the carbon material during the firing process is suppressed. And, when the average particle diameter of the carbon material is 120 nm or less, the network of the conductive auxiliary agent is easily formed. Therefore, the electron conductivity of the all solid battery 100 and the all solid battery 100a is improved.

Accordingly, both of the ionic conductivity and the electron conductivity of the all solid battery 100 and the all solid battery 100a are achieved.

When the ratio of the carbon material in the first electrode layer 11 and the second electrode layer 21 is excessively small, the carbon material may not be necessarily achieve the function as the conductive auxiliary agent. And so, it is preferable that the ratio of the carbon material in the first electrode layer 11 and the second electrode layer 21 has a lower limit. For example, it is preferable that the ratio of the carbon material in the first electrode layer 11 and the second electrode layer 21 is 5 vol % or more. It is more preferable that the ratio of the carbon material is 10 vol % or more.

When the ratio of the carbon material in the first electrode layer 11 and the second electrode layer 21 is excessively large, the ionic conductivity may be degraded or the density degree of the first electrode layer 11 and the second electrode layer 21 may be degraded or paste handling may be difficult. And so, it is preferable that the ratio of the carbon material in the first electrode layer 11 and the second electrode layer 21 has an upper limit. For example, it is preferable that the ratio of the carbon material in the first electrode layer 11 and the second electrode layer 21 is 60 vol % or less. It is more preferable that the ratio of the carbon material is 40 vol % or less.

Figure 3:
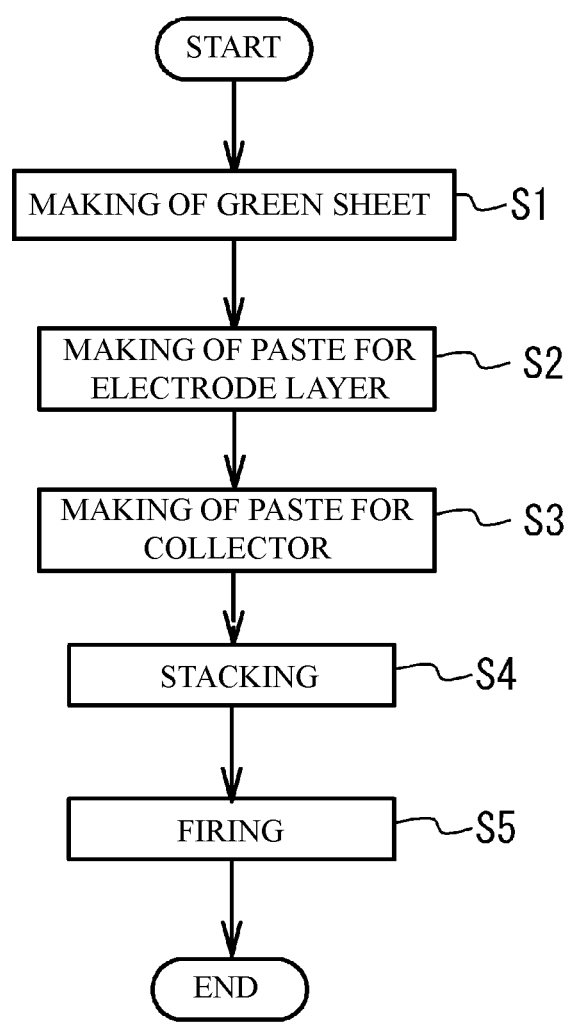
FIG. 3 illustrates a flowchart of a manufacturing method of an all solid battery.

FIG. 3 illustrates a flowchart of the manufacturing method of the all solid battery 100 and the all solid battery 100a.

(Making process of green sheet) Powder of the phosphoric acid salt-based solid electrolyte structuring the solid electrolyte layer 30 is made. For example, it is possible to make the powder of the phosphoric acid salt-based solid electrolyte structuring the solid electrolyte layer 30, by mixing raw material and additives and using solid phase synthesis method or the like. The resulting powder is subjected to dry grinding. Thus, a grain diameter of the resulting power is adjusted to a desired one. For example, the grain diameter of the resulting power is adjusted to a desired one by a planetary ball mil using $ZrO_2$ balls having a diameter of 5 mm cp.

The additive includes a sintering assistant. For example, the sintering assistant may include one or more of glass components such as Li—B—O-based compound, Li—Si—O-based compound, Li—C—O-based compound, Li—S—O-based compound, or Li—P—O-based compound.

The resulting powder is evenly dispersed into aqueous solvent or organic solvent together with a binding agent, a dispersing agent, a plasticizer and so on. The resulting power is subjected to wet crushing. And solid electrolyte slurry having a desired grain diameter is obtained. In this case, a bead mill, a wet jet mill, a kneader, a high pressure homogenizer or the like may be used. It is preferable that the bead mill is used because adjusting of particle size distribution and dispersion are performed at the same time. A binder is added to the resulting solid electrolyte slurry. Thus, solid electrolyte paste is obtained. The solid electrolyte paste is painted. Thus, a green sheet is obtained. The painting method is not limited. For example, a slot die method, a reverse coat method, a gravure coat method, a bar coat method, a doctor blade method or the like may be used. It is possible to measure grain diameter distribution after the wet crushing, with use of a laser diffraction measuring device using a laser diffraction scattering method.

(Making process of paste for electrode layer) Next, paste for electrode layer is made in order to make the first electrode layer 11 and the second electrode layer 21. For example, a conductive auxiliary agent, an active material, a solid electrolyte material, a binder, a plasticizer and so on are evenly dispersed into water or organic solvent. Thus, paste for electrode layer is obtained. The above-mentioned solid electrolyte paste may be used as the solid electrolyte material. A carbon material may be used as the conductive auxiliary agent. When the composition of the first electrode layer 11 is different from that of the second electrode layer 21, paste for electrode layer used for the first electrode layer 11 and another paste for electrode layer used for the second electrode layer 21 may be individually made.

In the embodiment, the carbon material of which the DBP oil absorption is 200 mL/100 g or less is used. For example, when the carbon material of which a porosity is small is used, the DBP oil absorption is reduced. From a viewpoint of reducing an absorption amount of liquid phase of a glass component, it is preferable that the DBP oil absorption is small. And so, it is preferable that the DBP oil absorption of the carbon material is 200 mL/100 g or less. It is more preferable that the DBP oil absorption is 100 mL/100 g or less.

When an average particle diameter of the carbon material is excessively small, the carbon material may be oxidized and disappear during the firing process. And so, it is preferable that the average particle diameter of the carbon material has a lower limit. In the embodiment, the average particle diameter of the carbon material is 40 nm or more. From a viewpoint of suppressing disappearance of the carbon material, it is preferable that the average particle diameter of the carbon material is large. And so, it is preferable that the average particle diameter of the carbon material is 40 nm or more. It is more preferable that the average particle diameter of the carbon material is 50 nm or more.

When the average particle diameter of the carbon material is excessively large, formation of network of the conductive auxiliary agent is suppressed during the firing process and the electron conductivity may be degraded. And so, it is preferable that the average particle diameter of the carbon material has an upper limit. In the embodiment, the average particle diameter of the carbon material is 120 nm or less. From a viewpoint of forming the network of the conductive auxiliary agent during the firing process, it is preferable that the average particle diameter of the carbon material is small. And so, it is preferable that the average particle diameter of the carbon material is 200 nm or less. It is more preferable that the average particle diameter of the carbon material is 100 nm or less.

(Making process of paste for electric collector) Next, paste for electric collector is made in order to make the first electric collector layer 12 and the second electric collector layer 22. It is possible to make the paste for electric collector, by evenly dispersing powder of Pd, a binder, dispersant, plasticizer and so on into water or organic solvent.

(Stacking process) The paste for electrode layer and the paste for electric collector are printed on both faces of the green sheet, with respect to the all solid battery 100 described on the basis of FIG. 1. The printing method is not limited. For example, a screen printing method, an intaglio printing method, a letter press printing method, a calendar roll printing method or the like may be used. In order to make a stacked device having a thin layer and a large number of stacked layers, the screen printing is generally used. However, an ink jet printing may be preferable when a micro size electrode pattern or a special shape is necessary.

Figure 4:
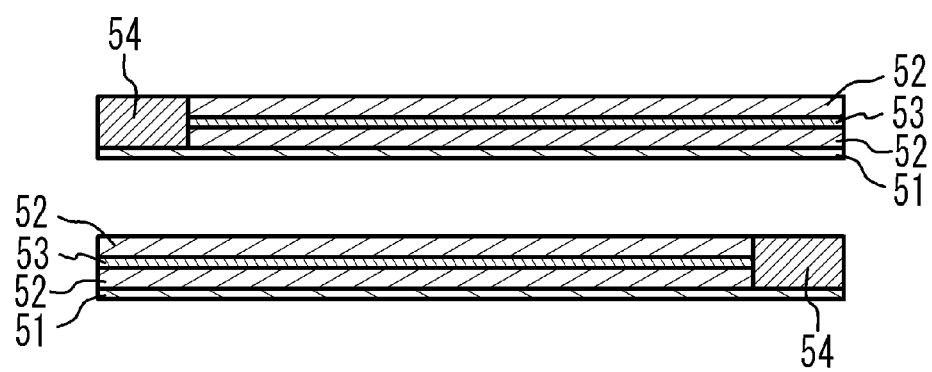
FIG. 4 illustrates a stacking process.

With respect to the all solid battery 100a described on the basis of FIG. 2, paste 52 for electrode layer is printed on one face of a green sheet 51 as illustrated in FIG. 4. Paste 53 for electric collector is printed on the paste 52 for electrode layer. And, another paste 52 for electrode layer is printed on the paste 53 for electric collector. A reverse pattern 54 is printed on a part of the green sheet 51 where neither the paste 52 for electrode layer nor the paste 53 for electric collector is printed. A material of the reverse pattern 54 may be the same as that of the green sheet 51. The green sheets 51 after printing are stacked so that each of the green sheets 51 is alternately shifted to each other. Thus, a multilayer structure is obtained. In this case, in the multilayer structure, a pair of the paste 52 for electrode layer and the paste 53 for electric collector are alternately exposed to the two edge faces of the multilayer structure.

(Firing process) Next, the obtained multilayer structure is fired. In the embodiment, an upper limit is determined in the oxygen partial pressure in the firing atmosphere, from a viewpoint of suppression of loss of the carbon included in the paste of electrode layer. In concrete, the oxygen partial pressure in the firing atmosphere is $2 \times 10^{-13}$ atm or less. On the other hand, a lower limit is determined in the oxygen partial pressure in the firing atmosphere, from a viewpoint of suppression of the melting of the phosphoric acid salt-based solid electrolyte. In concrete, the oxygen partial pressure in the firing atmosphere is $5 \times 10^{-22}$ atm or more. When the range of the oxygen partial pressure is determined in this manner, it is possible to suppress the carbon loss and the melting of the phosphoric acid salt-based solid electrolyte. An adjusting method of the oxygen partial pressure in the firing atmosphere is not limited.

It is preferable that oxygen partial pressure in the firing atmosphere is 10-13 atm or less, from a viewpoint of suppression of carbon loss. It is more preferable that the oxygen partial pressure is 10-14 atm or less. It is still more preferable that the oxygen partial pressure is less than 10-16 atm. It is preferable that oxygen partial pressure in the firing atmosphere is 10-22 atm or more, from a viewpoint of suppression of melting of phosphoric acid-based solid electrolyte. It is more preferable that the oxygen partial pressure is 10-21 atm or more.

In the firing process, it is preferable that a maximum temperature is 400 degrees C. to 1000 degrees C. It is more preferable that that maximum temperature is 500 degrees C. to 900 degrees C. In order to sufficiently remove the binder until the maximum temperature, a process for keeping a temperature lower than the maximum temperature in an oxidizing atmosphere may be performed. It is preferable that the firing is performed in the lowest possible temperature, from a viewpoint of reduction of the process cost. After the firing, a re-oxidizing process may be performed. In this manner, the all solid battery 100 or the all solid battery 100a is manufactured.

In the embodiment, the carbon material of which the DBP oil absorption is 100 g/200 mL or less is used as the conductive auxiliary agent used for the electrode layer paste. In this case, the amount of the liquid phase of the glass component, which is included in the solid electrolyte layer paste, adsorbed to the carbon material is suppressed. And, the sintering of the solid electrolyte layer 30 is promoted. And, prevention of the sintering of the solid electrolyte layer 30 or composition gap is suppressed. Therefore, the densifying of the solid electrolyte layer 30 is promoted. Accordingly, the ionic conductivity of the solid electrolyte layer 30 is improved.

When the average particle diameter of the carbon material is 40 nm or more, the loss of the carbon material during the firing process is suppressed. And, when the average particle diameter of the carbon material is 120 nm or less, the network of the conductive assistant is easily formed. Therefore, the electron conductivity of the all solid battery 100 and the all solid battery 100a is improved.

Accordingly, both of the ionic conductivity and the electron conductivity of the all solid battery 100 and the all solid battery 100a are achieved.

When the ratio of the carbon material in the electrode layer paste is excessively small, the carbon material may not be necessarily achieve the function as the conductive auxiliary agent. And so, it is preferable that the ratio of the carbon material in the electrode layer paste has a lower limit. For example, it is preferable that the ratio of the carbon material in the electrode layer paste is 5 vol % or more. It is more preferable that the ratio of the carbon material is 10 vol % or more.

When the ratio of the carbon material in the electrode layer paste is excessively large, the ionic conductivity may be degraded or the density degree of the first electrode layer 11 and the second electrode layer 21 may be degraded or paste handling may be difficult. And, even if the DBP absorption is small, the composition gap caused by liquid phase adsorption may be remarkable. And so, it is preferable that the ratio of the carbon material in the electrode layer paste has an upper limit. For example, it is preferable that the ratio of the carbon material in the electrode layer paste is 60 vol % or less. It is more preferable that the ratio of the carbon material is 50 vol % or less.

EXAMPLES

The all solid batteries in accordance with the embodiment were made and the property was measured.

(Example 1) As a sintering assistant, finely grinded amorphous powder of $LiPO_3$ which is Li—P—O-based compound was added to phosphoric acid salt-based solid electrolyte having a desirable grain diameter. The resulting phosphoric acid salt-based solid electrolyte was dispersed into dispersion medium. Thus, solid electrolyte slurry was prepared. The ratio of the sintering assistant with respect to the phosphoric acid salt-based solid electrolyte was 20 wt %. The ratio of P:Li was 1:1. A binder was added to the solid electrolyte slurry. Thus, solid electrolyte paste was prepared. A green sheet was made by painting the solid electrolyte paste.

Next, an electrode active material, solid electrolyte and a carbon material were weighed in a wet bead mill. The electrode active material, the solid electrolyte and the carbon material were kneaded together with a solvent and a binder. Thus, slurry was obtained. The slurry was painted. Thereby, a sheet was formed. The sheet was used as an electrode sheet including carbon. The carbon material of which the DBP oil absorption is 28 mL/100 g was used. An average particle diameter of the carbon material was 80 nm. A specific surface area of the carbon material was 24 $m^2/g$.

Next, a plurality of green sheets were stacked. The stacked green sheets were used as a solid electrolyte layer. The electrode sheet including the carbon were stacked on both an upper face and a lower face of the solid electrolyte layer. The resulting structure was stamped into a rectangular board shape of −10 mm. The board shape structure was used as a sample. The samples were fired. The firing temperature was 700 degrees C. The oxygen partial pressure during the firing process was 10-13 atm or less at a temperature of 500 degrees C. or less.

(Example 2) In an example 2, the average particle diameter of the carbon material used for the electrode sheet including carbon was 40 nm. The specific surface area of the carbon material was 62 $m^2/g$. The DBP oil absorption of the carbon material was 200 mL/100 g. Other conditions were the same as those of the example 1.

(Example 3) In an example 3, the average particle diameter of the carbon material used for the electrode sheet including carbon was 120 nm. The specific surface area of the carbon material was 20 $m^2/g$. The DBP oil absorption of the carbon material was 35 mL/100 g. Other conditions were the same as those of the example 1.

(Comparative Example 1) In a comparative example 1, the average particle diameter of the carbon material used for the electrode sheet including carbon was 30 nm. The specific surface area of the carbon material was 800 $m^2/g$. The DBP oil absorption of the carbon material was 360 mL/100 g. Other conditions were the same as those of the example 1.

(Comparative Example 2) In a comparative example 2, the average particle diameter of the carbon material used for the electrode sheet including carbon was 130 nm. The specific surface area of the carbon material was 18 $m^2/g$. The DBP oil absorption of the carbon material was 50 mL/100 g. Other conditions were the same as those of the example 1.

(Comparative Example 3) In a comparative example 3, the average particle diameter of the carbon material used for the electrode sheet including carbon was 40 nm. The specific surface area of the carbon material was 100 $m^2/g$. The DBP oil absorption of the carbon material was 250 mL/100 g. Other conditions were the same as those of the example 1.

(Comparative Example 4) In a comparative example 4, the average particle diameter of the carbon material used for the electrode sheet including carbon was 35 nm. The specific surface area of the carbon material was 69 $m^2/g$. The DBP oil absorption of the carbon material was 160 mL/100 g. Other conditions were the same as those of the example 1.

(Analysis) With respect to each sample of the examples 1 to 3 and the comparative examples 1 to 4, a true density of the material powder was measured with use of BELPycno dry density meter made by micro track bell limited company. The measured value was treated as 100%. And, the density degree of the sintered structure after firing was calculated. Moreover, conductivity (S/cm) was measured. Table 1 shows the results. The density degree of the sintered structure was the density degree of only solid electrolyte. Au electrodes were formed on a pair of side faces of the rectangular board which were not both main faces of the rectangular board. The side faces face with each other. Resistivity was calculated from a current value when a voltage of 0 V to 0.5 V was applied. Thus, the conductivity was calculated from the resistivity. After evaluation of the conductivity, weight and volume were measured after removing the Au electrodes and electrode layers by grinding. Thus, the density degree was calculated from the weight and the volume.

TABLE 1

|  | AVERAGE PARTICLE DIAMETER (nm) | DBP OIL ABSORPTION (mL/100 g) | DENSITY DEGREE OF SINTERED STRUCTURE (%) | ELECTRON CONDUCTIVITY (S/m) | RESULT |
|---|---|---|---|---|---|
| EXAMPLE 1 | 80 | 28 | 97 | 0.2 | ○ |
| EXAMPLE 2 | 40 | 200 | 90 | 0.5 | ○ |
| EXAMPLE 3 | 120 | 35 | 98 | 0.1 | ○ |
| COMPARATIVE EXAMPLE 1 | 30 | 360 | 70 | 0.02 | x |
| COMPARATIVE EXAMPLE 2 | 120 | 50 | 98 | 0.008 | x |
| COMPARATIVE EXAMPLE 3 | 40 | 250 | 75 | 0.1 | x |
| COMPARATIVE EXAMPLE 4 | 35 | 160 | 85 | 0.05 | x |

As shown in Table 1, the density degree of the sintered structures was 90% or more, in the examples 1 to 3 and the comparative example 2. It is thought that this was because the DBP oil absorption was 200 mL/100 g or less, the absorption amount of the liquid phase of the glass component was suppressed, and the sintering was promoted. On the other hand, in the comparative examples 1 and 3, the density degree of the sintered structure was a low value which was less than 90%. It is thought that this was because the DBP oil absorption was more than 200 mL/100 g, the liquid phase of the glass component was absorbed to the carbon material, and the sintering was prevented. In the comparative example 4, the average particle diameter of the carbon material was a low value which was 35 nm. The carbon material disappeared during the firing. Therefore, the electrical conductivity was a low value which was S/cm.

Next, in the examples 1 to 3, the electrical conductivity (S/cm) was 0.1 or more. It is thought that this was because the average particle diameter of the carbon material was 40 nm or more and 120 nm or less, and the function of the conductive auxiliary agent of the carbon material was sufficiently achieved. On the other hand, in the comparative examples 1 to 4, the electrical conductivity (S/cm) was less than 0.1. It is thought that this was because the average particle diameter of the carbon material was less than 40 nm or more than 120 nm, and the function of the conductive auxiliary agent of the carbon material was not sufficiently achieved.

In the examples 1 to 3, the density degree of the sintered structure was 90% or more and the electrical conductivity (S/cm) was 0.1 or more. Therefore, the examples 1 to 3 were determined as good "o". In the comparative example 1 to 4, at least one of the condition that the density degree of the sintered structure was 90% or more and the condition that the electrical conductivity (S/cm) was 0.1 or more was not achieved. Therefore, the comparative examples 1 to 4 were determined as bad "x".

Although the embodiments of the present invention have been described in detail, it is to be understood that the various change, substitutions, and alterations could be made hereto without departing from the spirit and scope of the invention.

What is claimed is:

1. An all solid battery comprising:
   a solid electrolyte layer including a glass component, a main component of the solid electrolyte layer being phosphoric acid salt-based solid electrolyte; and
   electrode layers that are provided on both main faces of the solid electrolyte layer,
   wherein the electrode layers include an electrode active material and a carbon material, the electrode active material being different from the carbon material, the carbon material acting as a conductive auxiliary agent and having an average particle diameter of 40 nm or more and 120 nm or less,
   wherein a DBP oil absorption of the carbon material is 200 mL/100 g or less,
   wherein a ratio of the carbon material in the electrode layers is 5 vol % or more and 60 vol % or less,
   wherein the electrode active material of one of the electrode layers has the same chemical composition as that of the other of the electrode layers,
   wherein the solid electrolyte layer and the electrode layers have a sintered structure, and
   wherein when a true density of the solid electrolyte before sintering is 100%, a density degree of only the solid electrolyte of the sintered structure is 90% or more, and an electrical conductivity (S/cm) of the sintered structure is 0.1 or more.

2. The all solid battery as claimed in claim 1, wherein the phosphoric acid salt-based solid electrolyte has a NASICON structure.

3. A manufacturing method of an all solid battery comprising:
   preparing a multilayer structure in which first electrode paste including a first carbon material, a green sheet including phosphoric acid salt-based solid electrolyte grains, and second electrode paste including a second carbon material are stacked in this order; and
   firing the multilayer structure,
   wherein the first carbon material and the second carbon material have an average particle diameter of 40 nm or more and 120 nm or less,
   wherein a DBP oil absorption is 200 mL/100 g or less, and wherein the multilayer structure after firing constitutes the all solid battery of claim 1.

4. The method as claimed in claim 3, wherein the phosphoric acid salt-based solid electrolyte has a NASICON structure.

5. The all solid battery as claimed in claim 1, wherein the DBP oil absorption of the carbon material is 35 mL/100 g or less.

\* \* \* \* \*